(12) United States Patent
Maniktala (10) Patent No.: US 8,755,449 B2
(45) Date of Patent: Jun. 17, 2014

(54) POWER OVER ETHERNET FOR BI-DIRECTIONAL ETHERNET OVER SINGLE PAIR

(71) Applicant: Microsemi Corporation, Aliso Viejo, CA (US)

(72) Inventor: Sanjaya Maniktala, Fremont, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 0 days.

(21) Appl. No.: 13/889,391

(22) Filed: May 8, 2013

(65) Prior Publication Data

US 2013/0301745 A1 Nov. 14, 2013

Related U.S. Application Data

(60) Provisional application No. 61/646,414, filed on May 14, 2012.

(51) Int. Cl.
*H04L 12/10* (2006.01)

(52) U.S. Cl.
USPC .......................................... 375/258; 713/300

(58) Field of Classification Search
CPC ................................. H04B 3/56; H04L 12/10
USPC .......................................... 375/258; 713/300
See application file for complete search history.

(56) References Cited

U.S. PATENT DOCUMENTS

| | | | | |
|---|---|---|---|---|
| 4,843,356 A * | 6/1989 | Lusignan et al. | ............ | 333/236 |
| 5,896,417 A * | 4/1999 | Lau | .............. | 375/258 |
| 5,994,998 A * | 11/1999 | Fisher et al. | ............ | 375/258 |
| 6,115,468 A * | 9/2000 | De Nicolo | ............ | 379/413 |
| 6,459,739 B1 * | 10/2002 | Vitenberg | ............ | 375/258 |
| 7,915,755 B2 * | 3/2011 | Diab et al. | ............ | 307/17 |
| 8,044,747 B2 * | 10/2011 | Yu et al. | ............ | 333/24 R |
| 8,132,027 B2 | 3/2012 | Blaha et al. | | |
| 2010/0019752 A1 * | 1/2010 | Diab et al. | ............ | 323/305 |
| 2010/0277293 A1 * | 11/2010 | Yu et al. | ............ | 340/310.11 |
| 2011/0055598 A1 * | 3/2011 | Yu | ............ | 713/300 |
| 2012/0102341 A1 * | 4/2012 | Hussain et al. | ............ | 713/300 |

OTHER PUBLICATIONS

Brooks, Douglas, "Differential Signals Rules to live by", printed circuit design, a CMP Media publication, Oct. 2001,—Itnernet Citation—Retrieved from http://www.ieee.li/pdf/essay/differ.*
"Electrical Transient Immunity for Power-Over-Ethernet", SLVA233A—Apr. 2006—Revised Aug. 2006, retrieved on Dec. 12, 2013 from http://www.ti.com/lit/an/slva233a/slva233a.pdf.*
Winslow, T.A., "Ultra Broadband MMIC Impedance Transformer," Microwave Conference (EUMC), 2011 41ST European , vol., No., pp. 854,857, Oct. 10-13, 2011.*

(Continued)

*Primary Examiner* — Daniel Washburn
*Assistant Examiner* — Berhanu Tadese
(74) *Attorney, Agent, or Firm* — Simon Kahn (57) ABSTRACT

A magnetics based hybrid circuit, comprising a receiver side transformer and a transmitter side transformer is described. Power is supplied via respective inductive elements coupled to respective first end of the receiver side transformer and the transmitter side transformer. A DC blocking element is further provided in series between the second end of the receiver side primary winding and the second end of the transmitter side primary winding.

5 Claims, 4 Drawing Sheets

(56) References Cited

OTHER PUBLICATIONS

Brooks, Douglas, "Differential Signals Rules to Live by", Printed Circuit Design, A CMP Media Publication, Oct. 2001,—Itnernet Citation—Retrieved From http://www.ieee.li/pdf/essay/differential_signals.pdf.*

"Electrical Transient Immunity for Power-Over-Ethernet", SLVA233A—Apr. 2006—Revised Aug. 2006, Retrieved From http://www.ti.com/lit/an/slva233a/slva233a.pdf.*

Tai-Cheng Lee and Behzad Razavi, A 125-MHz Mixed-Signal Echo Canceller for Gigabit Ethernet on Copper Wire, IEEE Journal of Solid State Circuits, vol. 36, No. 3, Mar. 2001, pp. 366-373, The Institute of Electrical and Electronics Engineers, Inc., New York, NY.

IEEE 802.3af—2003, pp. 29-57, 94-96, 102 and 115; published Jun. 18, 2003 by The Institute of Electrical and Electronics Engineers, Inc., New York.

IEEE 802.3at—2009, pp. 22-67; published Oct. 30, 2009 by The Institute of Electrical and Electronics Engineers, Inc., New York.

* cited by examiner

PRIOR ART

FIG. 2

PRIOR ART

FIG. 3

POWER OVER ETHERNET FOR BI-DIRECTIONAL ETHERNET OVER SINGLE PAIR

BACKGROUND OF THE INVENTION

The present invention relates to the field of powering data terminal equipment and more particularly to providing power over data communication cabling constituted of a single pair.

Ethernet communication, also known as IEEE 802.3 data communication, is typically implemented over a structured cable having 4 twisted wire pairs. Power of Ethernet (PoE), as described in IEEE 802.3af—2003 and IEEE 802.3.at—2009, as published by the Institute of Electrical and Electronics Engineers, New York, the entire contents of each document is incorporated herein by reference, is superimposed over the data utilizing phantom powering. In particular, the existing data transformers of Ethernet are center-tapped, and thus the DC current through the two halves of the transformer are of equal magnitude and opposite direction leaving no net flux in the transformer core.

Ethernet communication for speeds less than 1000 megabits per second (Mbps) is typically supplied over 2 twisted wire pairs, one of the pairs being used as a transmit pair from the hub equipment to the data terminal equipment (DTE), which when powered by PoE is also known as a powered device (PD), and a second of the pairs being used as a transmit pair from the data terminal equipment to the hub equipment. The other two pairs were typically not used, and were known as spare pairs. The term transmit is typically abbreviated TX and the term receive is typically abbreviated RX for simplicity. In such an embodiment either spare powering, or data pair powering, may be implemented.

Figure 1A:
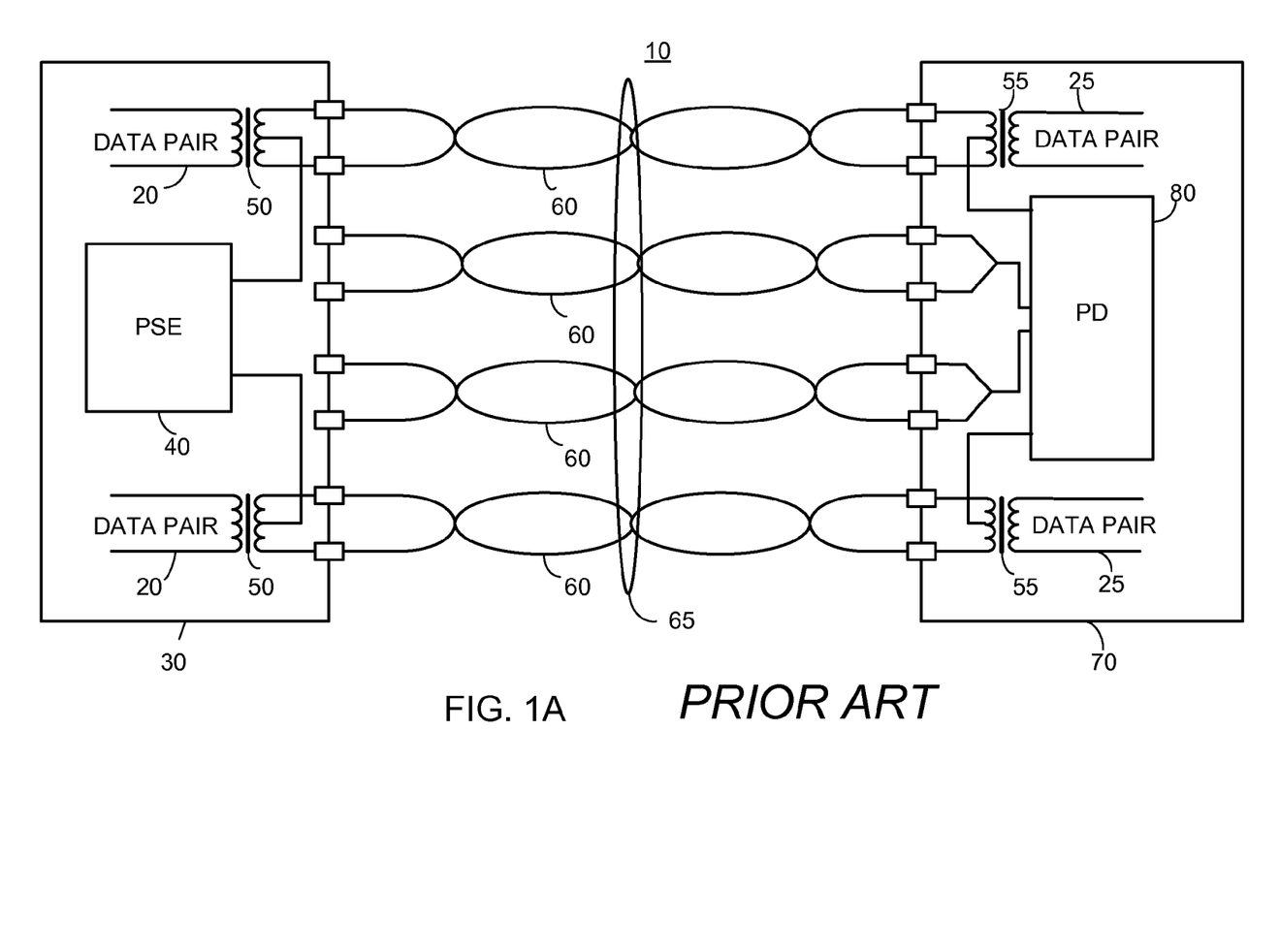
FIG. 1A illustrates a high level block diagram of an arrangement for powering a PD from a switch/hub equipment using phantom powering in accordance with the prior art.

FIG. 1A illustrates a high level block diagram of an arrangement 10 for powering a PD from a switch/hub equipment 30 using phantom powering in accordance with the above standards. Arrangement 10 comprises: switch/hub equipment 30 comprising a first and second data pair 20, a power sourcing equipment (PSE) 40, and a first and second data transformer 50; four twisted pair data connections 60 constituted in a single structured cable 65; and a powered end station 70 comprising a first and second data transformer 55, a first and a second data pair 25, and a PD 80. Powered end station 70 is also known as the DTE.

The primary of each of first and second data transformers 50 are coupled to respective data pairs 20. An output and return of PSE 40 are connected, respectively, to the center tap of the secondary of first and second data transformers 50. The output leads of the secondary of first and second data transformers 50 are respectively connected to first ends of a first and a second twisted pair data connection 60 of structured cable 65. The second ends of first and second twisted pair data connections 60 are respectively connected to the secondary of first and second data transformers 55 located within powered end station 70. The center tap of the secondary of each of first and second transformers 55 is connected to a respective input of PD 80. Third and fourth twisted pair data connections 60 of structure cable 65 are connected to respective inputs of PD 80 for use in an alternative powering scheme known to those skilled in the art. In another embodiment, as will be described further below, third and fourth twisted pair data connections 60 further carry data. First and second data pairs 25 are coupled to the primary winding of each of first and second data transformers 55 and represent data transmitted between powered end station 70, particularly PD 80, and switch/hub equipment 30, each direction provided on a respected twisted pair data connection 60.

In operation, PSE 40 supplies power over first and second twisted pair data connection 60, thus supplying both power and data over first and second twisted pair data connections 60 to PD 80. As described above, since power is transmitted and received via the center tap of the respective transformers 50, 55 DC flux does not build up in the respective transformers 50, 55 responsive to power from PSE 40.

Figure 1B:
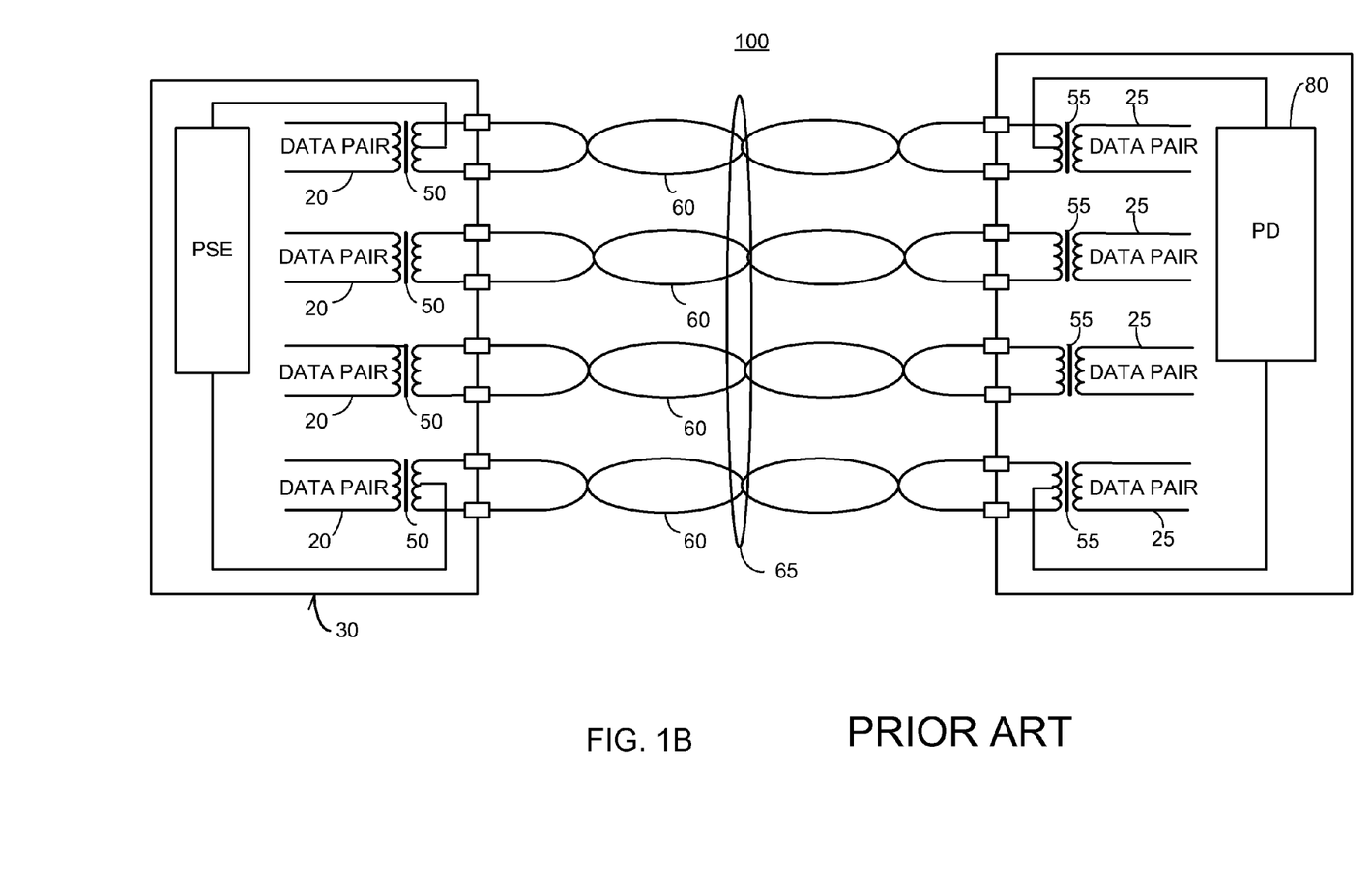
FIG. 1B illustrates a high level block diagram of an arrangement for powering a PD from a switch/hub equipment using phantom powering appropriate for Gigabit Ethernet in accordance with the prior art.

For speeds of 1000 Mbps, also known as Gigabit Ethernet, all 4 pairs are utilized for data communication, and each of the 4 pairs provide bi-directional communication. Thus, at both the hub equipment and at the DTE end, both a transmitter and a receiver are coupled to each pair. Arrangement 100 of FIG. 1B illustrates such an arrangement. Arrangement 100 is in all respects similar to arrangement 10, with the exception that data pairs 20 are provided coupled to each of the four twisted pair data connections 60 via respective transformers 50 and similarly four data pairs 25 are coupled to respective twisted pair data connections 60 via respective transformers 55. As indicated above each of data pairs 20, 25 are implemented as bidirectional transmitter receiver pairs as will be described further below, responsive to a respective hybrid circuit.

Figure 2:
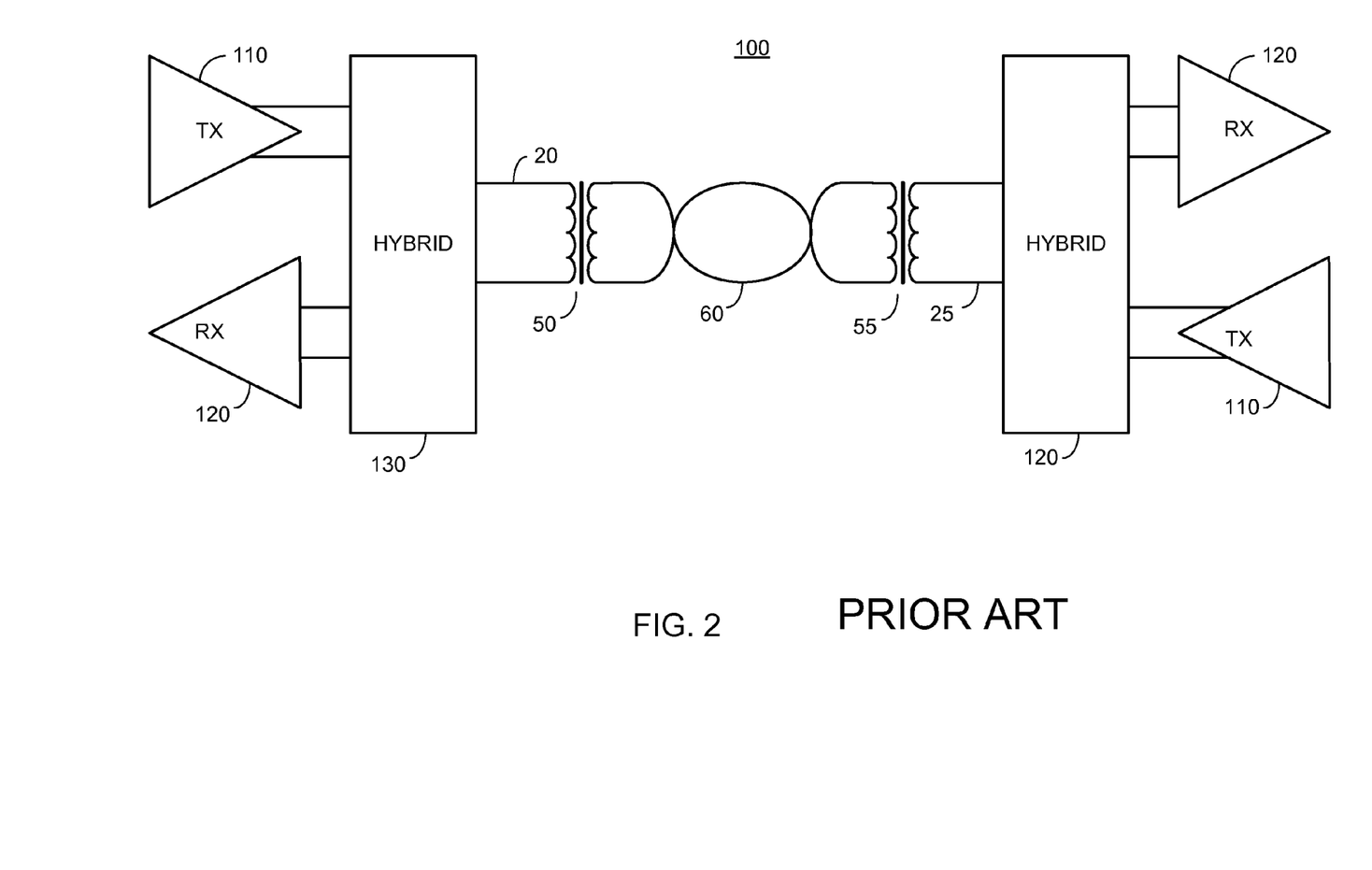
FIG. 2 illustrates a high level block diagram of an arrangement to provide bidirectional communication over each twisted data pair connection in accordance with the prior art.

FIG. 2 illustrates a high level block diagram of an arrangement 100, known to the prior art, to provide bidirectional communication over each twisted pair data connection 60. At each end a transmitter 110, a receiver 120 and a hybrid circuit 130 is provided. The output of each transmitter 110, comprising a differential pair, is coupled to a respective differential input of the respective hybrid circuit 130 and the input of each receiver 120, comprising a differential pair, is connected to a respective differential output of the respective hybrid circuit 130. A bi-directional port of hybrid circuit 130 at the hub side, comprising a differential pair, is coupled to the primary winding of transformer 50 and presents data pair 20 and a bi-directional port of hybrid circuit 130 at the PD side, comprising a differential pair, is coupled to the primary winding of transformer 55 and presents data pair 25. The secondary winding of transformer 50 is coupled to a first end of a respective twisted pair data connection 60 and the secondary winding of transformer 55 is coupled to a second end of the respective twisted pair data connection 60.

Each hybrid circuit 130 is arranged to channel data transmitted by the coupled transmitter 110 towards twisted pair data connection 60 and away from the coupled receiver 120. Hybrid circuit 120 may be implemented electronically or magnetically, as known to those skilled in the art, although typically electronic hybrid circuits are implemented.

The arrangement of FIG. 2 thus provides bi-directional communication on each of the twisted pair data connection 60. Data communication over a single pair, thus obviating the need for a structured cable of 4 twisted pairs, is similarly possible using arrangement 100, has been commercially implemented, and is commonly known as single pair Ethernet.

Disadvantageously, the arrangement of FIG. 2, when utilized for single pair Ethernet does not provide a plurality of powering paths over twisted pair data connection 60 which would result in no net flux. This is particularly true, since with a single twisted pair, the power and return paths must be provided over only the 2 wires of twisted pair data connection 60.

U.S. Pat. No. 8,044,747 issued Oct. 25, 2011 to Yu et al., entitled "Capacitor Coupled Ethernet", the entire contents of which is incorporated herein by reference, provides a system and method for enabling power applications over a single conductor pair. In one embodiment, data transformers are coupled to a single conductor pair using one or more direct current (DC) blocking elements that preserve an alternating current path. Power is injected onto the single conductor pair after the DC blocking elements and power is extracted from the single conductor pair before the DC blocking elements. Disadvantageously, such a solution places the one or more DC blocking elements in the data path before the detecting element, which may lead to signal degradation.

SUMMARY OF THE INVENTION

Accordingly, it is a principal object of the present invention to overcome at least some of the disadvantages of the prior art. This is provided in certain embodiments by a magnetics based hybrid circuit, comprising a receiver side transformer and a transmitter side transformer. Power is supplied via respective inductive elements coupled to respective first end of the receiver side transformer and the transmitter side transformer. A DC blocking element is further provided in series between the second end of the receiver side primary winding and the second end of the transmitter side primary winding.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term winding is particularly meant to mean a winding of electrically conducting wire forming an inductor. The winding may form a stand alone inductor, or be magnetically coupled to another winding forming a transformer.

Figure 3:
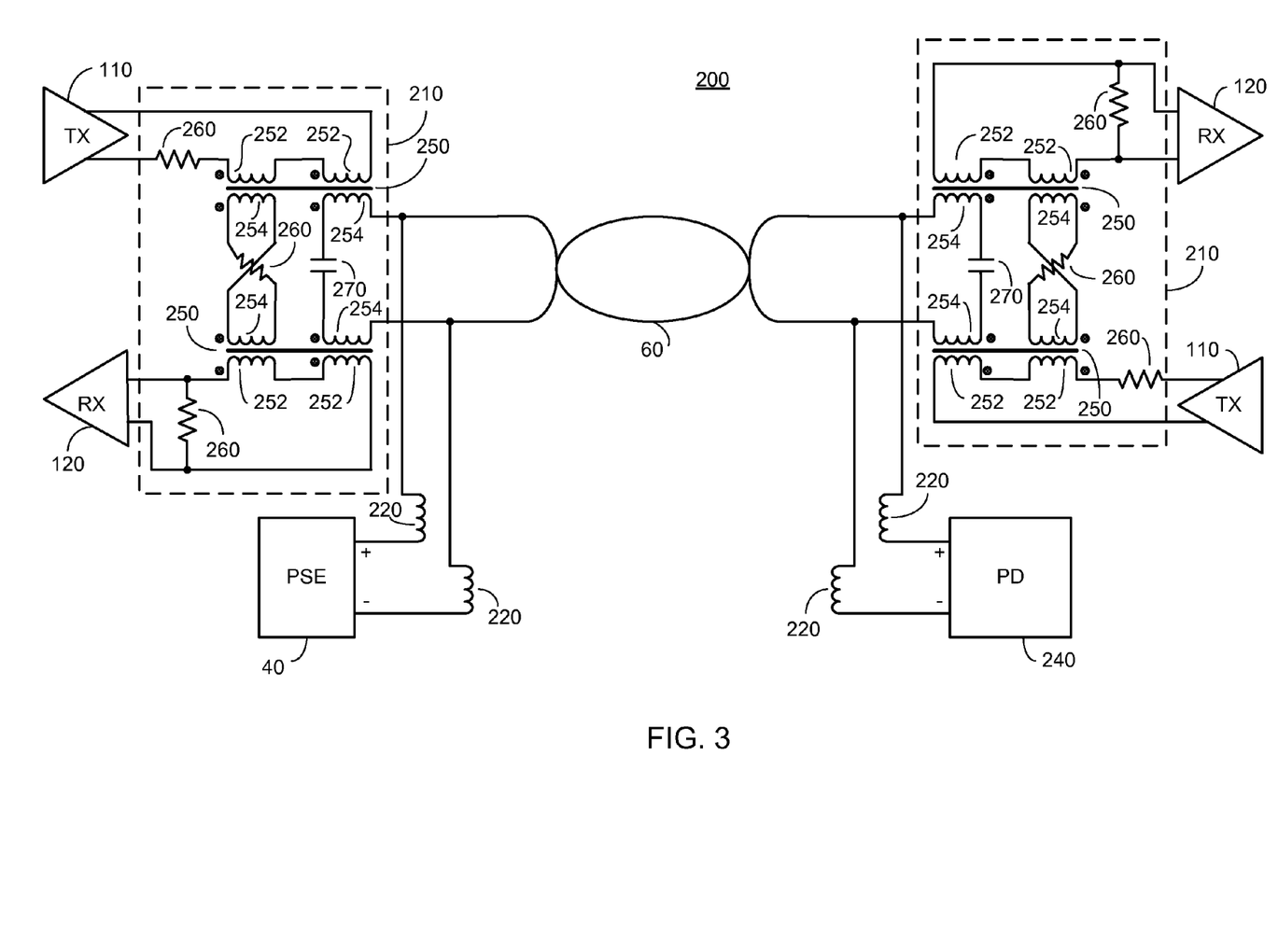
FIG. 3 illustrates a high level schematic of an exemplary arrangement providing bidirectional data communication and powering over a single twisted pair data connection.

FIG. 3 illustrates a high level schematic of an exemplary arrangement 200 providing bidirectional data communication and powering over a single twisted pair data connection 60. Arrangement 200 comprises: a PSE 40; a twisted pair data connection 60; a first transmitter 110; a first receiver 120; a first combination DC blocking and hybrid circuit 210; a first inductive element 220; a second inductive element 220; a PD 240; a second transmitter 110; a second receiver 120; a second combination DC blocking and hybrid circuit 210; a third inductive element 220; and a fourth inductive element 220. Each of first and second combination DC blocking and hybrid circuit 210 comprise a first and a second transformer 250, a first, second and a third resistor 260 and a DC blocking capacitor 270. Each transformer 250 comprises a first and a second primary winding 252 and a first and a second secondary winding 254, arranged about a common core and magnetically inter-coupled.

Each transformer 250 is described as having a first and a second primary winding 252 primarily for ease of understanding, it being understood that first and second primary windings 252 may be combined into a single primary winding 252 without limitation.

A first lead of the differential output of first transmitter 110 is connected via first resistor 260 of first combination DC blocking and hybrid circuit 210 to a first end of first primary winding 252 of first transformer 250 of first combination DC blocking and hybrid circuit 210, denoted with a dot for polarity. A second end of first primary winding 252 of first transformer 250 of first combination DC blocking and hybrid circuit 210 is connected to a first end of second primary winding 252 of first transformer 250 of first combination DC blocking and hybrid circuit 210, denoted with a dot for polarity. A second end of second primary winding 252 of first transformer 250 of first combination DC blocking and hybrid circuit 210 is connected to a second lead of the differential output of first transmitter 110.

A first lead of the differential input of first receiver 110 is connected to a first end of first primary winding 252 of second transformer 250 of first combination DC blocking and hybrid circuit 210, denoted with a dot for polarity. A second end of first primary winding 252 of second transformer 250 of first combination DC blocking and hybrid circuit 210 is connected to a first end of second primary winding 252 of second transformer 250 of first combination DC blocking and hybrid circuit 210, denoted with a dot for polarity. A second end of second primary winding 252 of second transformer 250 of first combination DC blocking and hybrid circuit 210 is connected to a second lead of the differential input of first receiver 120. Second resistor 260 of first combination DC blocking and hybrid circuit 210 is connected across the differential inputs of first receiver 120.

A first end of first secondary winding 254 of first transformer 250 of first combination DC blocking and hybrid circuit 210, denoted with a dot for polarity, is connected to a first end of third resistor 260 of first combination DC blocking and hybrid circuit 210. A second end of first secondary winding 254 of first transformer 250 of first combination DC blocking and hybrid circuit 210 is connected to a first end of first secondary winding 254 of second transformer 250 of first combination DC blocking and hybrid circuit 210, denoted with a dot for polarity. A second end of first secondary winding 254 of second transformer 250 of first combination DC blocking and hybrid circuit 210 is connected to a second end of second resistor 260 of first combination DC blocking and hybrid circuit 210.

A first end of second secondary winding 254 of first transformer 250 of first combination DC blocking and hybrid circuit 210, denoted with a dot for polarity, is connected via DC blocking capacitor 270 to a first end of second secondary winding 254 of second transformer 250 of first combination DC blocking and hybrid circuit 210, denoted with a dot for polarity. A second end of second secondary winding 254 of first transformer 250 of first combination DC blocking and hybrid circuit 210 is connected to a first output of PSE 40 via first inductive element 220, the first output of PSE 40 denoted as the positive output for clarity, without limitation, and to a first end of a first wire of twisted pair data connection 60. A second end of second secondary winding 254 of second transformer 250 of first combination DC blocking and hybrid circuit 210 is connected to a second output of PSE 40 via second inductive element 220, the second output of PSE 40 denoted as the return for clarity, without limitation, and to a first end of a second wire of twisted pair data connection 60. In particular, as will be apparent, combination DC blocking and hybrid circuit 210 is polarity insensitive.

A first lead of the differential output of second transmitter 110 is connected via first resistor 260 of second combination DC blocking and hybrid circuit 210 to a first end of first primary winding 252 of first transformer 250 of second combination DC blocking and hybrid circuit 210, denoted with a dot for polarity. A second end of first primary winding 252 of first transformer 250 of second combination DC blocking and hybrid circuit 210 is connected to a first end of second primary winding 252 of first transformer 250 of second combination DC blocking and hybrid circuit 210, denoted with a dot for polarity. A second end of second primary winding 252 of first transformer 250 of second combination DC blocking and hybrid circuit 210 is connected to a second lead of the differential output of second transmitter 110.

A first lead of the differential input of second receiver 110 is connected to a first end of first primary winding 252 of second transformer 250 of second combination DC blocking and hybrid circuit 210, denoted with a dot for polarity. A second end of first primary winding 252 of second transformer 250 of second combination DC blocking and hybrid circuit 210 is connected to a first end of second primary winding 252 of second transformer 250 of second combination DC blocking and hybrid circuit 210, denoted with a dot for polarity. A second end of second primary winding 252 of second transformer 250 of second combination DC blocking and hybrid circuit 210 is connected to a second lead of the differential input of second receiver 120. Second resistor 260 of second combination DC blocking and hybrid circuit 210 is connected across the differential inputs of second receiver 120.

A first end of first secondary winding 254 of first transformer 250 of second combination DC blocking and hybrid circuit 210, denoted with a dot for polarity, is connected to a first end of third resistor 260 of second combination DC blocking and hybrid circuit 210. A second end of first secondary winding 254 of first transformer 250 of second combination DC blocking and hybrid circuit 210 is connected to a first end of first secondary winding 254 of second transformer 250 of second combination DC blocking and hybrid circuit 210, denoted with a dot for polarity. A second end of first secondary winding 254 of second transformer 250 of second combination DC blocking and hybrid circuit 210 is connected to a second end of third resistor 260 of second combination DC blocking and hybrid circuit 210.

A first end of second secondary winding 254 of first transformer 250 of second combination DC blocking and hybrid circuit 210, denoted with a dot for polarity, is connected via DC blocking capacitor 270 to a first end of second secondary winding 254 of second transformer 250 of second combination DC blocking and hybrid circuit 210, denoted with a dot for polarity. A second end of second secondary winding 254 of first transformer 250 of second combination DC blocking and hybrid circuit 210 is connected to a second end of the first wire of twisted pair data connection 60 and via third inductive element 220 to a first input of PD 240, denoted as the positive input for clarity, without limitation. A second end of second secondary winding 254 of second transformer 250 of second combination DC blocking and hybrid circuit 210 is connected to a second end of second wire of twisted pair data connection 60 and via fourth inductive element 220 to a second input of PD 240, denoted as the return for clarity, without limitation.

In one embodiment, each of first, second, third and fourth inductive elements 220 are constituted of a stand-alone inductor. In another embodiment, each of first, second, third and fourth inductive elements 220 are constituted of ferrite beads which provide high AC resistance at data frequencies instead of reactive impedance. In one particular embodiment, the ferrite beads of first, second, third and fourth inductive elements 220 are constituted of nickel zinc which provide ohmic resistance at high frequencies, and thus do not present phase changes. In yet another embodiment first and second inductive element 220 are constituted of a pair windings on a single core arranged to offer impedance to differential signals appearing on single twisted pair data connection 60. Additionally, or optionally, third and fourth inductive element 220 are similarly constituted of a pair windings on a single core arranged to offer impedance to differential signals appearing on single twisted pair data connection 60. Each of first, second and third resistors 260 of the respective combination DC blocking and hybrid circuit 210 are preferably matched to provide impedance matching. DC blocking capacitor 270 is selected to pass frequencies of data transmission without appreciable impedance.

In operation, each combination DC blocking and hybrid circuit 210 provides DC blocking and echo cancellation. For clarity, operation of first combination DC blocking and hybrid circuit 210 will be detailed, it being understood by those skilled in the art that the identical explanation is to be applied to second combination DC blocking and hybrid circuit 210. In the event that first transmitter 110 is active, the differential signal creates a current flow through first windings 252 of first transformer 250, which is mirrored in second windings 254 of first transformer 250. Due to the crossed connections via third resistor 260, the current flow through first windings 252 of second transformer 250, responsive to the differential signal from first transmitter 110, cancel current flow responsive thereto reflected back from second combination DC blocking and hybrid circuit 210 via twisted pair data connection 60. In some further detail, the polarity of current flow experienced by first receiver 120 responsive to the output of first transmitter 110, received via first and second primary windings 252 and first secondary winding 254 of second transformer 250 is 180° out of phase with the polarity of current flow experienced by first receiver 120 responsive to the reflected signal received via twisted pair data connection 60 and reflected to receiver 120 via second secondary winding 254 of second transformer 250. DC blocking capacitor 270 prevents a short circuit for current injected by PSE 40.

Inductive elements 220 prevent PSE 40 from appearing as a capacitive load to data signals traversing twisted pair data connection 60.

Similarly, current flow caused by a differential signal received over twisted pair data connection 60, originating in second transmitter 110, creates a current flow through second windings 254 of first and second transformers 250, which is mirrored in first windings 252. Due to the crossed connections via third resistor 260, the current flow through first windings 252 of first transformer 250 experienced by first transmitter 110 are cancelled by current flow reflected back from the current flow experienced by first receiver 120. In some further detail, the polarity of current flow experienced by first transmitter 110 responsive to the current flow received via twisted pair data connection 60 is 180° out of phase with the polarity of current flow experienced by first transmitter 110 reflected by the cross connection.

The operation of combination DC blocking and hybrid circuit 210, in the absence of DC blocking capacitor 270, which as described above does not impact operation in relation to high frequency signals, is known to those skilled in the art.

Referring to PD 240, power is received from the second ends of secondary windings 254, and inductive elements 220 prevent PD 240 from appearing as a capacitive load to data signals traversing twisted pair data connection 60. PD 240 typically comprises a diode bridge input circuit thus providing the above mentioned polarity insensitivity, and a under voltage lockout circuit to prevent startup of any load circuitry until sufficient voltage appears across the input leads of PD 240. Such a PD 240 is known to those skilled in the art, and in the interest of brevity is not further detailed.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A circuit providing power over a single data pair comprising:
   a first inductive element;
   a second inductive element;
   a first transformer, said first transformer having a primary winding, a first secondary winding and a second secondary winding, said primary winding, first secondary winding and second secondary winding of said first transformer magnetically inter-coupled, each of said primary winding and said first and second secondary windings of said first transformer having a first end and a second end;
   a second transformer, said second transformer having a primary winding, a first secondary winding and a second secondary winding, said primary winding, first secondary winding and second secondary winding of said second transformer magnetically inter-coupled, each of said primary winding and said first and second secondary windings of said second transformer having a first end and a second end; and
   a direct current (DC) blocking element, wherein,
   the first end of said primary winding of said first transformer is arranged to receive a first polarity of a transmitted differential signal and the second end of said primary winding of said first transformer is arranged to receive a second polarity of the transmitted differential signal, said second polarity opposing said first polarity,
   the first end of said first secondary winding of said first transformer coupled to the second end of said first secondary winding of said second transformer, the second end of said first secondary winding of said first transformer coupled to the first end of said first secondary winding of said second transformer,
   the first end of the second secondary winding of said first transformer coupled to the first end of the second secondary winding of said second transformer via said DC blocking element, the second of end of the second secondary winding of said first transformer coupled via said first inductive element to a first lead of one of a power sourcing equipment and a powered equipment and further arranged to be coupled to a first end of a first lead of a twisted pair data connection, the second end of the second secondary winding of said second transformer coupled via said second inductive element to a second lead of said one of a power sourcing equipment and a powered equipment and further arranged to be coupled to a first end of a second lead of the twisted pair data connection, and
   said first transformer and said second transformer are connected with a polarity such that current entering the first end of said primary winding of the first transformer is reflected to enter the first end of said primary winding of the second transformer via said first secondary winding of said first transformer and said first secondary winding of said second transformer with a polarity opposite that of a signal reflected via the twisted pair data connection.

2. The circuit of claim 1, wherein the first end of the primary winding of the second transformer is arranged to provide a received input of a first polarity to a receiver, and the second end of the primary winding of the second transformer is arranged to provide the received input of a second polarity to the receiver, said second polarity opposing said first polarity.

3. The circuit of claim 1, wherein at least one of said first inductive element and said second inductive element are ferrite beads.

4. The circuit of claim 3, wherein the ferrite beads are constituted of nickel zinc and present an ohmic resistance at data transmission frequencies associated with said transmitted differential signal.

5. The circuit of claim 1, wherein said first inductive element and said second inductive element are magnetically coupled to form a transformer.

* * * * *